(12) United States Patent
Ismail et al.

(10) Patent No.: US 9,967,818 B2
(45) Date of Patent: May 8, 2018

(54) METHOD AND SYSTEM FOR AN ACCURATE ENERGY-EFFICIENT OUTDOOR LOCALIZATION ON A MOBILE DEVICE

(71) Applicants: Umm-Al-Qura University, Makkah (SA); Umm-Al-Qura University, Mecca (SA)

(72) Inventors: Heba Allah Aly AbdEl-Halim Aly Ismail, Alexandria (EG); Moustafa Amin Abdelazim Youssef, Makkah (EG)

(73) Assignee: Umm-Al-Qura University, Makkah (SA)

( * ) Notice: Subject to any disclaimer, the term of this patent is extended or adjusted under 35 U.S.C. 154(b) by 505 days.

(21) Appl. No.: 14/636,095

(22) Filed: Mar. 2, 2015

(65) Prior Publication Data

US 2016/0007286 A1    Jan. 7, 2016

Related U.S. Application Data

(63) Continuation of application No. PCT/IB2014/062925, filed on Jul. 7, 2014.

(51) Int. Cl.
*H04W 4/02* (2018.01)
*H04W 52/02* (2009.01)
*H04W 4/04* (2009.01)

(52) U.S. Cl.
CPC ....... *H04W 52/0225* (2013.01); *H04W 4/026* (2013.01); *H04W 4/027* (2013.01);
(Continued)

(58) Field of Classification Search
CPC . H04W 52/0225; H04W 4/026; H04W 4/027; H04W 4/04; Y02B 60/50
See application file for complete search history.

(56) References Cited

U.S. PATENT DOCUMENTS

2008/0262728 A1* 10/2008 Lokshin ............... G01C 21/165
                                                              701/472
2009/0323121 A1* 12/2009 Valkenburg .......... G01B 11/002
                                                              358/1.18

(Continued)

*Primary Examiner* — Qun Shen
(74) *Attorney, Agent, or Firm* — Geeta Kadambi; Riddhi IP LLC

(57) ABSTRACT

A method and a system that uses standard cell-phone sensors to provide accurate and energy-efficient outdoor localization suitable for mobile navigation design. System and method employs a dead-reckoning localization approach and leverages these road landmarks, among others such as virtual landmarks, to reset the accumulated error and achieve accurate localization. For consuming low energy the system and method uses only energy-efficient sensors or sensors that are already running for other purposes. We present the design of System and method of leveraging crowd-sourcing to automatically learn virtual landmarks and their locations. Tests of the system and method on android devices in both city and highway driving show the accuracy of results for local cell phones to within 8.4 m median error in city roads and 16.6 m on highways. Moreover, compared to GPS and other systems, the battery lifetime was extended by 347%, achieving even better localization results than GPS.

10 Claims, 14 Drawing Sheets

(52) U.S. Cl.
CPC ............... *H04W 4/04* (2013.01); *Y02D 70/00* (2018.01); *Y02D 70/12* (2018.01); *Y02D 70/122* (2018.01); *Y02D 70/142* (2018.01); *Y02D 70/144* (2018.01); *Y02D 70/164* (2018.01); *Y02D 70/26* (2018.01)

(56) References Cited

U.S. PATENT DOCUMENTS

| | | | | |
|---|---|---|---|---|
| 2010/0295803 A1* | 11/2010 | Kim | ................... | G06F 3/0488 345/173 |
| 2011/0071758 A1* | 3/2011 | Cho | ................... | G01C 21/3682 701/431 |
| 2011/0172906 A1* | 7/2011 | Das | ................... | G01C 21/20 701/533 |
| 2011/0184644 A1* | 7/2011 | McBurney | ............ | G01C 21/12 701/532 |
| 2014/0005930 A1* | 1/2014 | Chu | ................... | G01C 21/30 701/445 |
| 2014/0074762 A1* | 3/2014 | Campbell | ............. | G06Q 40/00 706/46 |
| 2014/0358434 A1* | 12/2014 | Zhang | ................. | G01C 21/165 701/501 |
| 2015/0281910 A1* | 10/2015 | Choudhury | ............. | G01S 5/021 455/456.1 |
| 2016/0069697 A1* | 3/2016 | Oel | ................... | G01C 21/3476 701/426 |
| 2017/0086164 A1* | 3/2017 | Park | ....................... | G01S 19/00 |

* cited by examiner (a) City (b) Highway (a) City (b) Highway

METHOD AND SYSTEM FOR AN ACCURATE ENERGY-EFFICIENT OUTDOOR LOCALIZATION ON A MOBILE DEVICE

FIELD OF TECHNOLOGY

The present invention relates to a system and a method that uses mobile device sensor to provide accurate and energy efficient outdoor localization suitable for vehicle navigation. More specifically the mobile device may be a smart phone for example.

BACKGROUND

Location-based services (LBS) have become an integral part of our daily life with applications including car navigation, location-based social networks, and context-aware predication and advertisement. Different LBS require different localization accuracies; Generally, GPS is considered the de facto standard for ubiquitous and accurate outdoor navigation. However, GPS is an energy-hungry technology that can drain the scarce battery resource of mobile devices quickly. In addition, its accuracy is limited in areas with obscured access to the satellites, e.g. in tunnels and many urban areas.

To address the high energy requirement of GPS-based localization, a number of outdoor localization systems have been proposed over the years (Ionut Constandache et. al. 2009, Ionut Constandache et. al. 2010, and Moustafa Youssef et. al. 2010). For example, city-wide WiFi and cellular-based localization systems depend on fingerprinting the WiFi and cellular networks through a war driving process to remove the need for GPS. Other systems, e.g. (Ionut Constandache et. al. 2010, and Moustafa Youssef et. al. 2010), depend on the inertial sensors in today's smart-phones to obtain the location through a dead-reckoning approach and revert to GPS sampling with a low duty cycle to reset the accumulated localization error. However, this saving in energy usually comes at reduced localization accuracy, affecting the range of possible LBS. There is a need for efficient energy utilization devices for more accurate guiding systems.

SUMMARY

In the present disclosure, we propose a system and method (Dejavu) capable of providing both accurate and energy efficient outdoor localization. At the core of this novel system and method is using a dead-reckoning approach based on the low energy profile inertial sensors (i.e. the accelerometer, compass, and gyroscope). However, using the array of sensors available in today's cell phones. In one embodiment, the system and method identifies unique points in the environment, i.e. landmarks or anchors, and uses them to reset the error accumulation in the dead-reckoning displacement; Bridges, tunnels, curves, and even potholes all have unique sensor signatures and represent frequent error-resetting opportunities along the road.

For example, when the car goes over a bump, system and method detects the bump signature on the sensors and resets the car location to the bump location. System and method constructs a database of multi-model sensor anchors and leverages it to achieve accurate outdoor car localization. To maintain energy-efficiency, System and method depends on energy-efficient sensors as well as sensors that are already running for other purposes, e.g. GSM and opportunistic WiFi signal strength.

To build the anchor database, System and method uses a crowd-sourcing approach, where cell phones contribute their sensor information and location estimate. System and method analyzes these sensor readings to detect physical anchors, such as bridges and tunnels, as well as virtual anchors (e.g. points with a unique cellular signal strength signature). Implementation of System and method over android phones shows that it can provide outdoor car localization with a median accuracy of 8.4 m inside cities and 16.6 m in highways. A phone running System and method drains power 347% more efficiently than GPS. In addition, System and method can provide even better accuracy than GPS inside cities.

In summary, we propose the architecture of System and method: a system that combines dead-reckoning with sensed road anchors to provide accurate and energy-efficient outdoor localization suitable for car navigation.

We provide a framework for detecting unique outdoor landmarks in the environment based on the phone sensors. A unified finite state machine approach is used to detect bootstrapping physical anchors (e.g. tunnels, bridges, turns, bumps). In addition, unsupervised learning techniques are used to further detect virtual anchors (landmark with unique sensors signatures) and to automatically and transparently grow the landmark database in a crowd-sourcing approach.

We implement our system on android-based phones and evaluate its performance as compared to the state-of-the-art systems, in different scenarios.

In one embodiment, a method may comprise of collecting a raw sensor data in the given environment using a sensor that is already present in a mobile device; estimating a dead reckoning data from the mobile device as an initial location for the user; detecting a physical anchor data in a given environment using the sensor that is already present in the mobile device's data; detecting a virtual anchor data in the given environment using the sensor that is already present in the mobile device too; and calculating an accurate location of the mobile device using the physical anchor data and the virtual anchor data to reset the error in the dead reckoning data for displaying an accurate user location data.

Other features will be apparent from the accompanying figures and from the detailed description that follows.

BRIEF DESCRIPTION OF THE DRAWINGS

Example embodiments are illustrated by way of example and no limitation in the graph and in the accompanying figures, like references indicate similar elements and in which.

Other features of the present embodiments will be apparent from the accompanying detailed description that follows.

DETAILED DESCRIPTION

The present disclosure relates to a system and method for gathering information on a mobile device in an energy efficient manner, using the landmarks and user input data to determine accurate location information for a given user. Although the present embodiments have been described with reference to specific example embodiments, it will be evident that various modifications and changes may be made to these embodiments without departing from the broader spirit and scope of the various embodiments. The mobile devices may be smart phones with different operating systems, iPad, eye glasses enabled with camera and/or cell phone, fitness wearable's, sports garments, sports bikes, motorcycles and any computer enabled devices for example.

Figure 1:
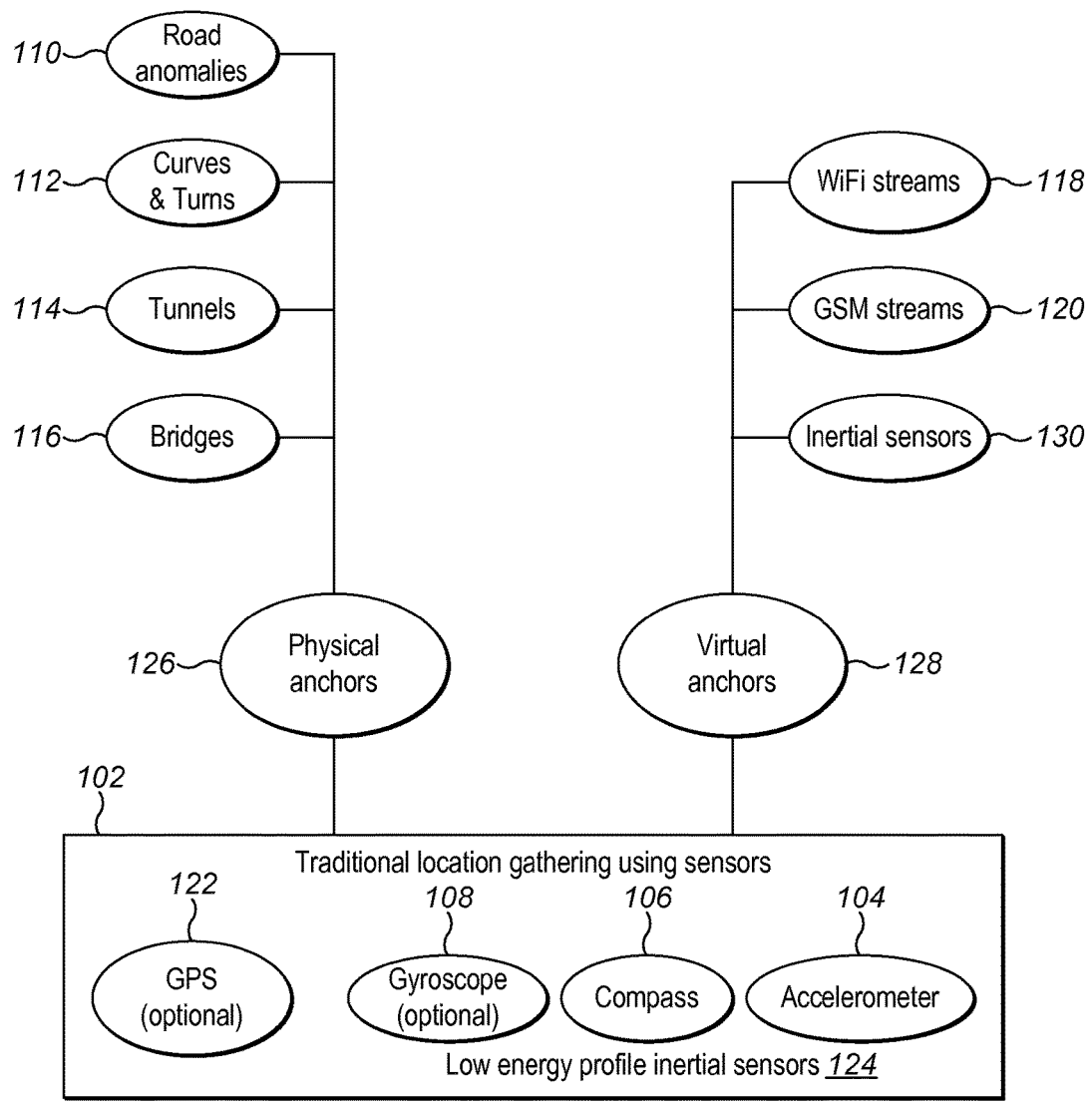
FIG. 1 is a diagram illustrating the location information gathering method 102 through subsystems, namely GPS 122, and Low Energy Profile Inertial Sensors 124. Note that GPS is optional in smart phones and not required to use the proposed methodology to estimate location. Inertial sensors are Accelerometer 104, Compass 106 and Gyroscope 108. The proposed methodology, System and method, in device uses these subsystems to study the unique characteristics and signatures of Physical Anchors and Landmarks 126 and Virtual Anchors 128 that are otherwise not properly represented in commercial systems.

FIG. 1 shows the location information gathering module 102 subsystems. Generally GPS 122 provides the location information of the device. In addition, Low Energy Profile Inertial Sensors 124, namely Accelerometer 104, Compass 106 and Gyroscope 108 are also used to capture the location information as GPS does not estimate well in areas such as tunnels and bridges. In addition, GPS does not predict potholes and curves properly either. Also, keeping the GPS "on" all the time drains the battery. Dead-reckoning as a strategy is used for outdoor localization through sensors that includes GPS (optional) 122 and inertial sensors 124 such as gyroscope (optional) 104, compass (mandatory) 106 and accelerometer (mandatory) 108 that are available in smart phones. This proposal goes a step further in analyzing the signatures of physical anchors and landmarks 126 such as bridges 116, tunnels 114, curves and turns 112 and potholes and other road anomalies 110 to estimate locations that are generally missed in commercial maps and hence minimizes errors. In addition, the proposal also uses virtual anchors 128 such as GSM or CDMA information including strength (including Cell ID and Receiver Signal Strength) 120 and WiFi information including signal strength 118 and inertial sensors 130 for fine-tuning the results further. It also uses inertial sensors such as accelerometer, compass, gyroscope and WiFi information (MAC address and RSS). The technique can also use other sensors when available. The gyroscope and the GPS may be optional. In addition, the proposal also uses virtual anchors 128 such as GSM or CDMA information including Cell ID and Receiver Signal Strength 120 and WiFi information including signal strength 118 and inertial sensors 130 for fine-tuning the results further.

Figure 2:
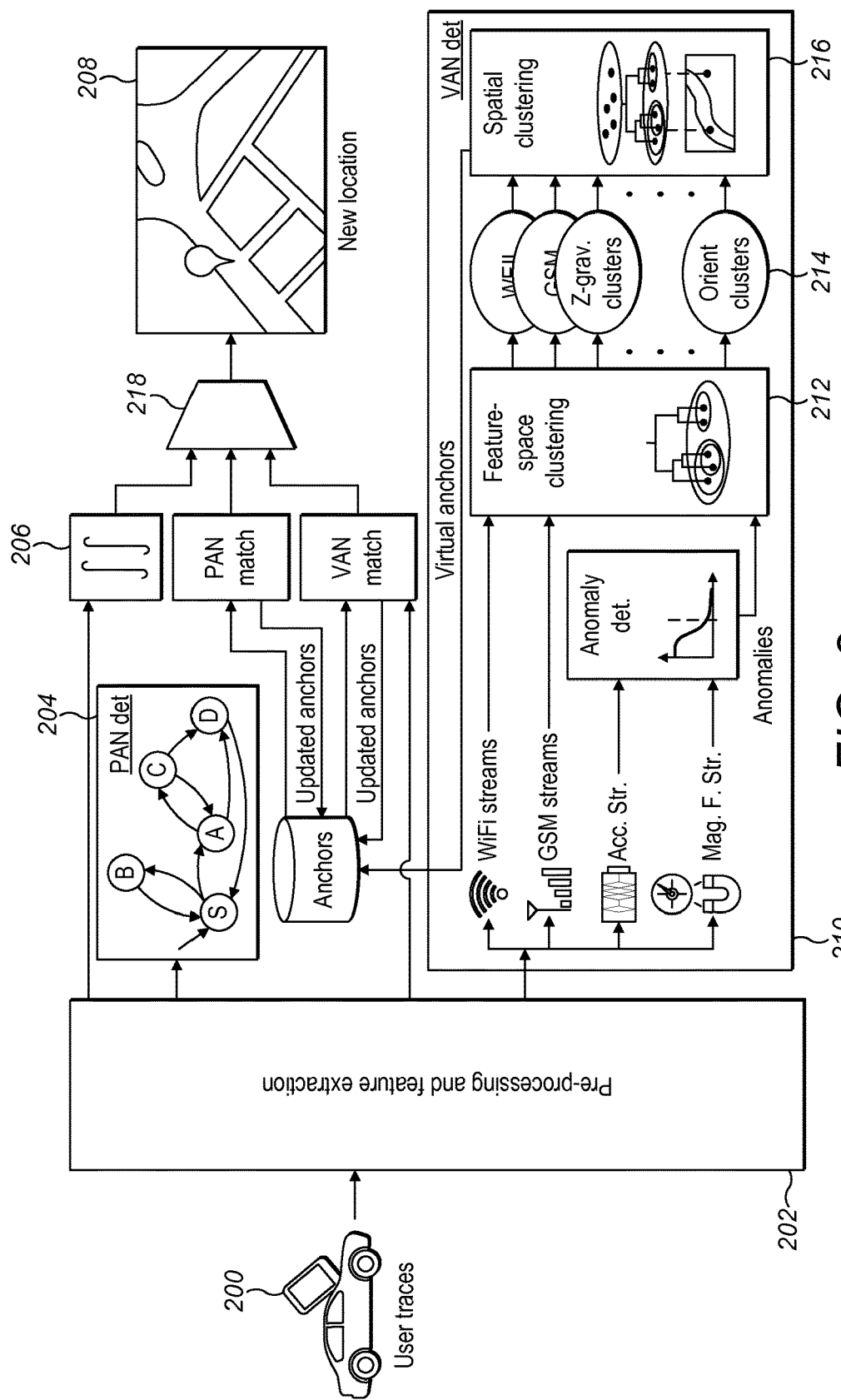
FIG. 2 depicts the System and method architecture. The phone location is estimated using dead-reckoning, physical (PAN) 204 and virtual (VAN) 210-216 anchors to reset accumulated error. Sensor traces are also mined to detect new anchors 206, improving the system accuracy over time.

FIG. 2 describes the block diagrams of the system architecture and method flow. The system and method of the instant invention (Dejavu) has two main modules: anchor detection and location fusion. Physical Anchor (PAN) 204 and Virtual Anchor (VAN) 210-216 contribute towards the Anchor intelligence. The system estimates the location of a cell phone 200 that is attached to the car windshield or dashboard using a dead-reckoning approach, where the new location is calculated based on the previous location and displacement (calculated from the accelerometer) along the direction of motion (estimated from the compass and gyroscope). Preprocessing and feature extraction is performed 202 using the cellphone sensor data. Due to the noisy inertial sensors, error accumulates with time. To reduce this error accumulation, Dejavu automatically builds and leverages an anchor database 206, based on the collected sensors information, to reset the error; whenever the phone detects an anchor signature, the phone location is adjusted to the anchor location and error is reset.

Raw Sensor Information: The system collects raw sensor information from cell phones 200. These include inertial sensors 124 as well as cellular network information (associated cell tower ID and its Received Signal Strength (RSS) plus neighbouring cell towers and associated RSS). The inertial sensor 130 data is a vector quantity along the three dimensions. We use the individual components as well as the combined magnitude as input data. These sensors have the advantage of having a low cost energy profile and being run all the time during the phone operation, to maintain cellular connectivity or to detect phone orientation changes. Therefore, using them for localization consumes zero extra energy. In addition, Dejavu opportunistically leverages the WiFi chip, if enabled, to collect surrounding WiFi APs. Note that the submission is general to take into account common sensors such as Microphone, Camera, and Temperature in addition to the described low-energy profile sensors.

Dead-Reckoning and Anchor-Based Error Resetting: The system and method uses the linear acceleration combined with the direction of motion ( ) to compute the phone displacement based on its previous location. The acceleration signal is double integrated to obtain the displacement and the compass is used to obtain the direction of motion ( ). To compute the new phone position, we use the Vincenty's formula, rather than the Euclidian distance, as it takes the Earth curvature into account (Moustafa Youssef et. al. 2010). Due to the noise in the accelerometer and compass readings, error accumulates as time goes on. To limit the accumulated error, system and method uses both physical 204 and virtual anchors 210-216 along the road to reset the localization error 210 to predict the location 208.

Figure 3:
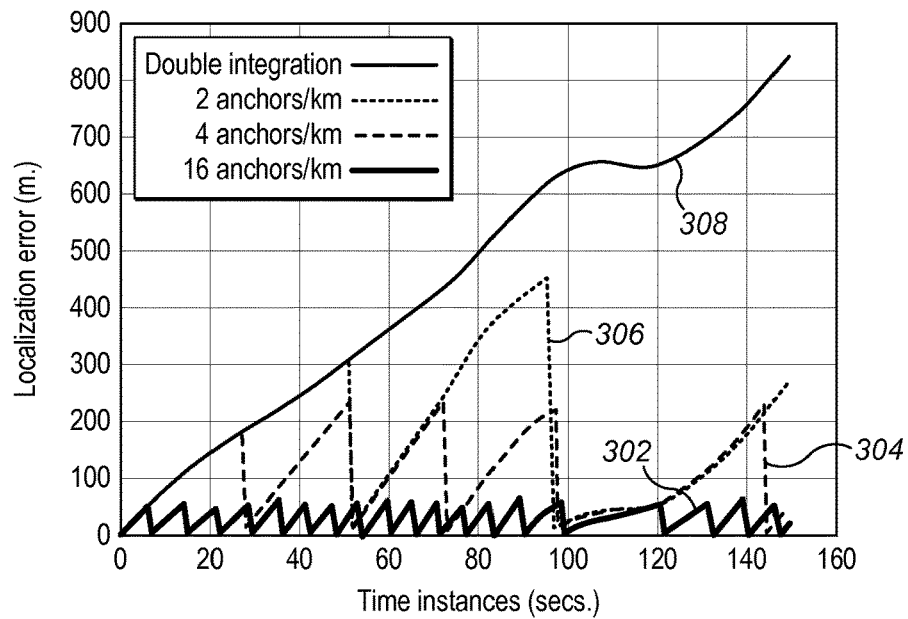
FIG. 3 compares double integration (dead-reckoning) error to System and method with different anchor densities per KM 302-308, where the trip length is 1.5 KM.

FIG. 3 shows that higher the density of anchors, the more frequent is the resetting opportunities. Hence higher accuracies are reached in 16 Anchors/KM 302 than in 4 Anchors/KM 304, or 2 Anchors/KM 306, or double integration 308.

Figure 4:
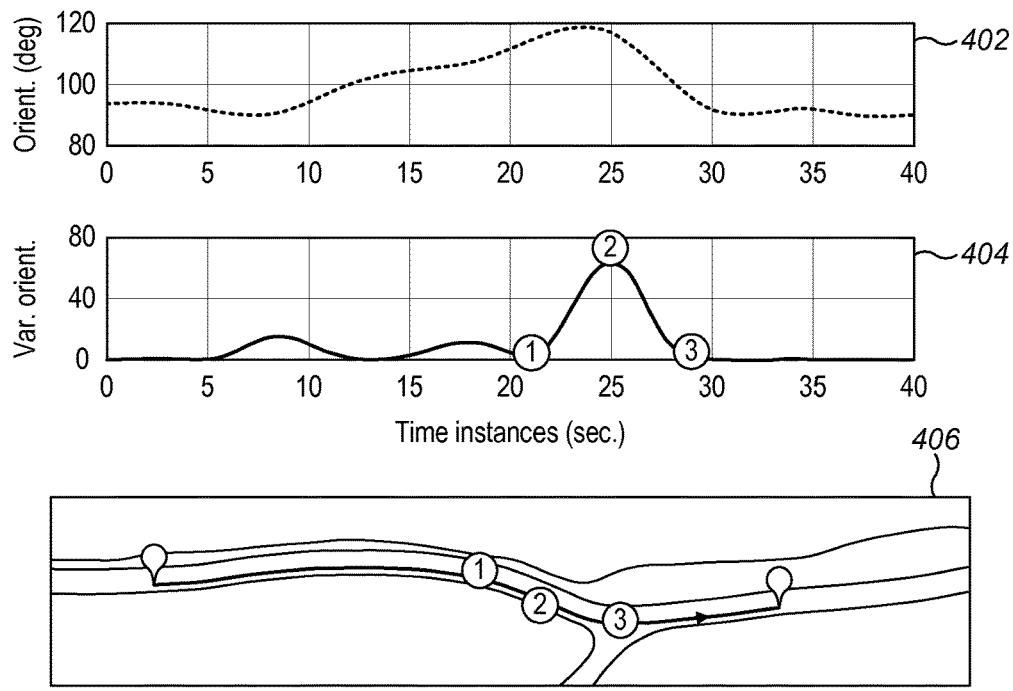
FIG. 4 shows the effect of the orientation angle to a car moving along the curve 406. The variance of the orientation 402-404 can be used to detect different numbered landmarks.

Anchors Detection: Our analysis showed that as a car (mobile device) moves along the road network, there are a large number of road features that can be identified based on their unique signature on different sensors. For example, FIG. 4 shows the change of the phone orientation angle when the car moves along a curved road 406. The FIG. 4 highlights that unique features (e.g. variance of orientation angle 402) can be extracted from the sensor trace to reflect unique anchors (e.g. transition from a straight to a curved segment) on the road. These unique anchors can be used to reset the phone location and hence reduce the error. The variance graph 404 clearly identifies the position before the turn compared to before and after.

The instant system and method uses two types of anchors: physical anchors 204 and virtual anchors 210-216. Physical anchors 204 can be mapped to road feature and have uniquely identifiable sensor signatures based on a certain template. These include bridges, tunnels 602, turns, curves 402, railway crossings, cat's eyes, and speed humps 702. Those anchors locations can be extracted from the map or through prior knowledge 202. Dejavu uses these physical anchors to seed its anchor database in a new city and bootstrap the error resetting process.

On the other hand, virtual anchors are detected automatically using unsupervised machine learning techniques to further extend the size of the anchor database 204, providing more error resetting opportunities 302 and hence enhancing accuracy. These virtual anchors have a unique signature in the sensor signal space and do not necessarily have a physical association with a road feature. Examples include points with unique GSM or WiFi RSS signature, areas with anomalous sensor behavior, among others. Those virtual anchors and their locations are learned through a crowd-sourcing process in Dejavu.

Preprocessing: Anchor detection in Dejavu 204, 210-216, is based on consistent changes in the raw signal. To reduce the effect of noise and spurious changes, e.g. a sudden break or lane change, we apply a low-pass filter to the raw sensor data. In particular, we use local weighted regression to smooth the data (William S. Cleveland et. al. 1988).

Physical Anchors: Physical anchors 126, 204 are used to seed the anchor database. These are anchors that can be identified from the map and/or prior knowledge of their locations. We could identify different classes of physical anchors that have a unique signature on the multi-modal raw sensor vector including bridges, tunnels 602-606, turns, curves 404, railway crossing 702-706, cat's eyes 702-706, speed humps, among others. Note that fine-grained differentiation between different classes, e.g. separating curves from turns, is important as it reduces the confusion between adjacent anchors.

Figure 5:
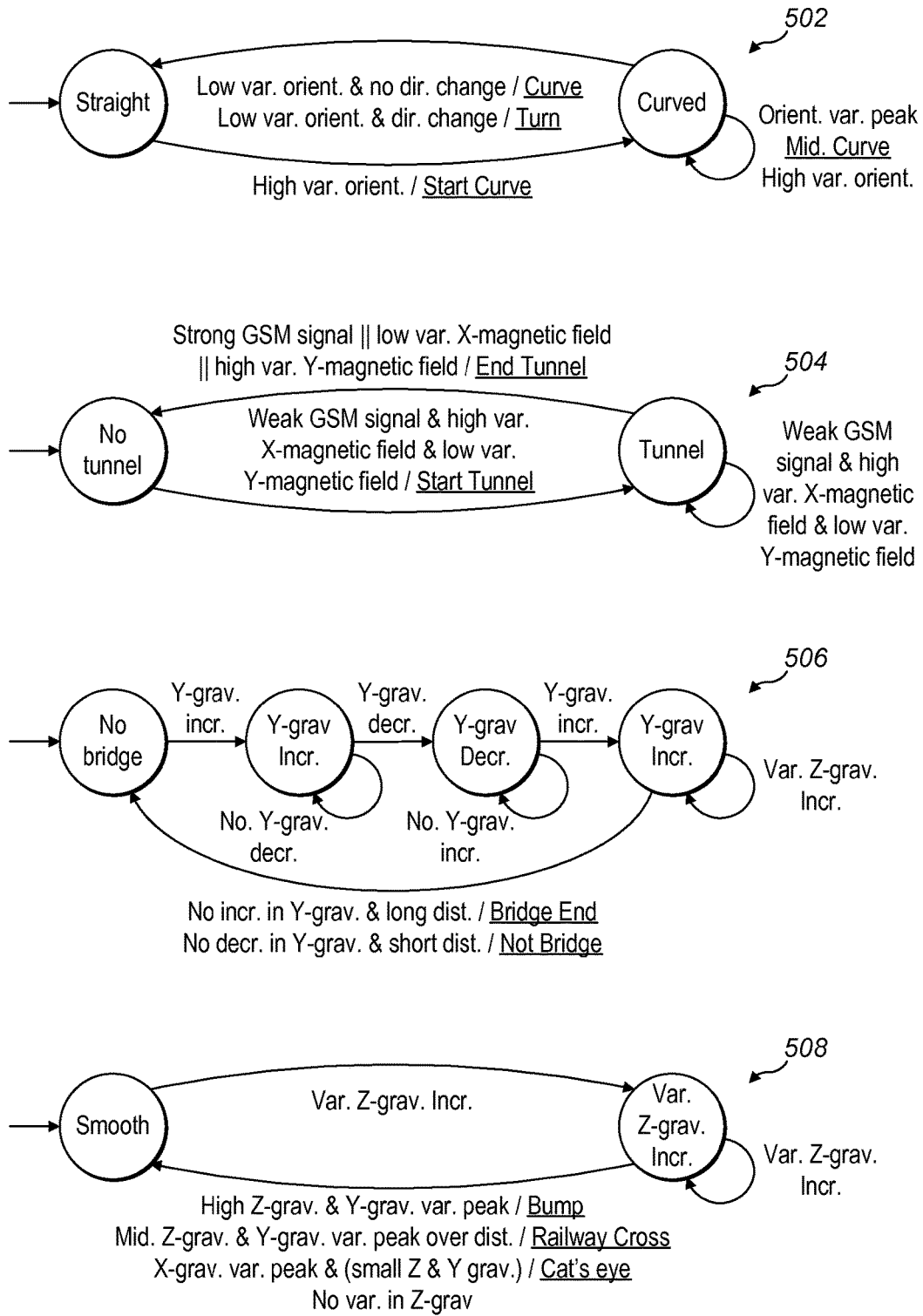
FIG. 5 shows a Mealy finite state machine for detecting different classes of physical anchors 502-508. The anchors are identified as output of the machine.

Mealy State Machine: FIG. 5 gives a Mealy finite state machine that can be used to detect the different classes 502-508. For example, the current state changes from "Straight" to "Curved" 502 when high variance in orientation is detected and a "Curve Start" anchor is identified. While at the "Curved" state, a "Mid. Curve" anchor is identified when a peak in orientation is detected. Also, "Turn" anchor is identified when low variance in orientation and direction change is detected and the user's state changes back to "Straight". If there is no direction change, a "Curve" anchor is identified instead of the "Turn". Similarly 504 define the Tunnel related anchors, 506 define "Bridge End" anchor detection, and 508 define the road anomalies anchor detection. Note that different sensors can be used to identify the same landmark, which is useful for increasing the detection accuracy.

Road Curves and Turns: Road curvature, including curves and sharp turns, forces the car to change its direction 406, which results in a big variance in the phone's orientation (FIG. 4). This can be captured using the orientation angle 402. To further differentiate between curves and turns we note that turns has a large difference between their start and end orientation angles. The associated anchors are detected at the beginning and end of the curve (when the variance goes above or below a threshold) at the point corresponding to the peak of variance 404, or at the location of the turn (angle change is above a threshold).

Figure 6:
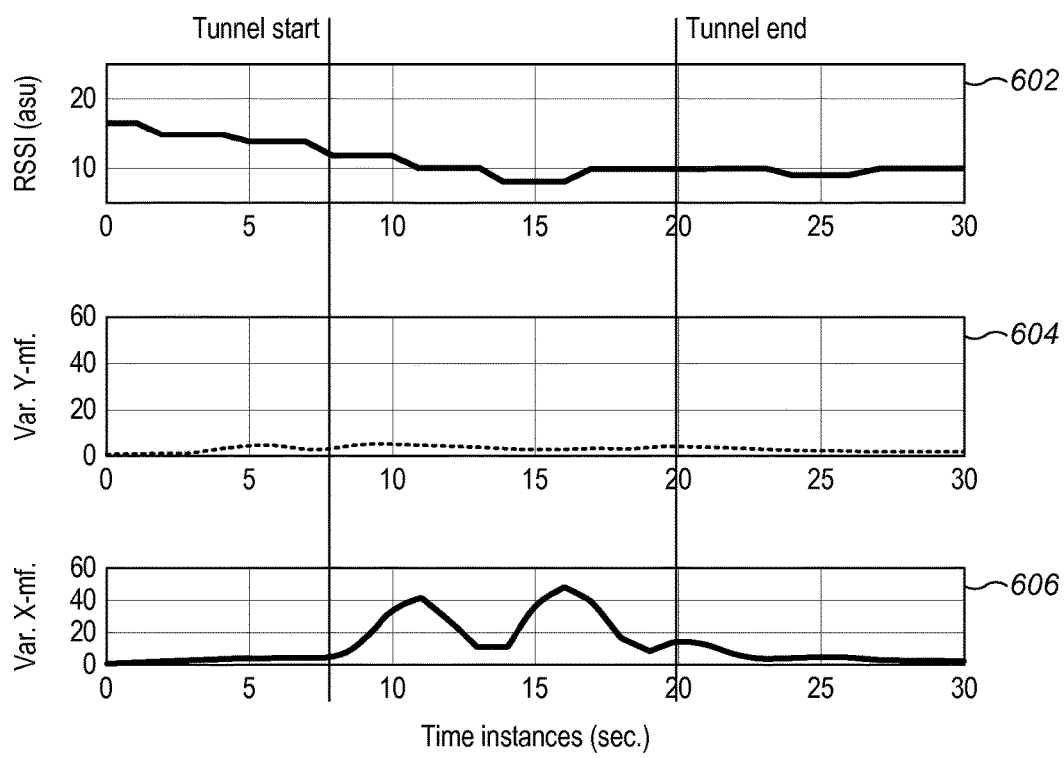
FIG. 6 shows an example of the different sensors behavior that characterize a tunnel: reduction in the cellular RSS 602, high variance of the ambient magnetic field in x-direction 606, and low variance of the ambient magnetic field in y-direction 604.

Tunnels: Going inside tunnels causes a drop in the cellular signals (for the associated and neighboring cells). We also noticed a large variance in the ambient magnetic field in the x-direction (perpendicular to the car direction of motion) while the car is inside the tunnel. This can be explained by the metal that exists on the side of the tunnel structure. Note that other classes of anchors may lead to a large variance in the magnetic field x-direction. However, we found that tunnels are unique in having a large drop in the cellular RSS 602, high variance in the x-axis magnetic field 606, and low variance in the y axis (direction of car motion) magnetic field 604 as shown in FIG. 6. The associated anchors are detected at both the beginning and end of the tunnel.

Figure 7:
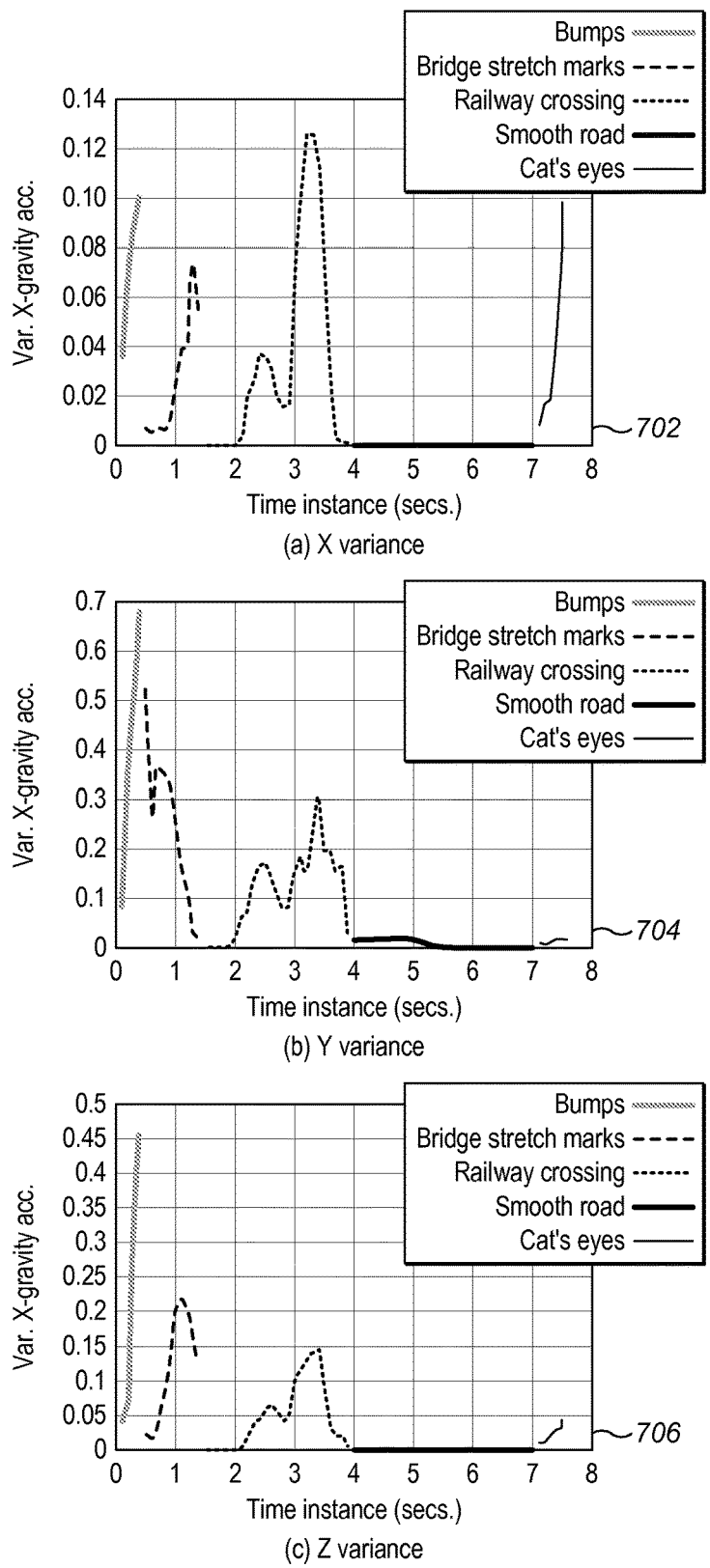
FIG. 7 shows the effect of different road conditions on the X 702, Y 704, and Z 706 gravity acceleration variance. Cat's eyes have the lowest Y and Z variance, stretch markers are only detected inside a bridge, and bumps have the highest Y and Z variances, while the railway crossing has a medium Y and Z variance.

Bridges: Bridges cause the car to go up at the start of the bridge and then go down at the end of the bridge. This is reflected on the y-gravity 704 or z-gravity 706 acceleration in FIG. 7. Although other classes, such as bumps, cause the same effect (y or z gravity acceleration going up then down), bridges are unique in having this effect over a longer distance. The associated anchor is detected at the end of the bridge. Note that the bridge stretch marks are detected as another class of anchor.

Road Anomalies: Just like bridges, bumps, speed humps, cat's eyes, bridge stretch marks, and railway crossings all cause the car to move up then down, affecting all gravity acceleration axes. However, unlike bridges, all these classes affect the gravity acceleration over a small distance. To further separate these classes, we employ other sensors as follows (FIG. 7):

Cat's eyes: Unlike other road anomalies, the cat's eyes structure does not cause the car moving above them to have high variance in the y 704 or z-axis 706 gravity acceleration. Speed humps usually have the highest variance in the y-axis 704 and z-axis 706 gravity acceleration compared to the other classes. Bridge stretch marks are only detected if the system detects that the car is on a bridge. Railway crossings lead to a medium variance in the y-axis 704 and z-axis 706 gravity acceleration over a longer distance compared to other road anomalies.

Virtual Anchors: To further enhance accuracy and exploit other error opportunities, Dejavu uses unsupervised learning techniques to identify virtual anchors that have distinct signature on cell-phone sensor readings along the road. These include points with unique GSM 118 or WiFi RSS 120 signature as well as anomalies in other sensors signatures.

FIG. 2 summarizes our virtual anchor detection technique. First, anomaly detection techniques 210 are used to identify anomalies in one or more sensors readings. Those anomalies are then clustered in the sensor space to identify candidate clusters 212 of virtual anchors. Finally, the points of each cluster are then spatially clustered 216 to identify the location of each anchor. An anchor is recognized if the cluster size is above a threshold and does not overlap with other instances of the same class within its surrounding area.

Features Selection: We have two main classes of sensors: vector-valued (e.g. WiFi 118 and cellular 120, 214) and scalar-valued sensors (e.g. x-gravity).

Vector-Valued Sensors: Cellular towers information can be used as anchors. In particular, the GSM cellular specifications give the tower ID and the corresponding RSS for the cell tower the phone is associated with and up to six neighboring cells. This information is available through APIs in modern cell phones and presents an energy-free opportunity for obtaining ubiquitous virtual anchors. Similarly, when the WiFi interface is enabled, users moving along the road hear WiFi access points (APs) from nearby buildings. Each WiFi sample corresponds to the list of APs MAC addresses and their corresponding RSS values. Cellular and WiFi anchors correspond to points in the RSS signal space with unique signature. To compute the distance between two samples in the cellular or WiFi feature space, we experimented with different fingerprinting techniques (Paramvir Bahl et al 2000, and Moustafa Youssef et. al. 2010). We ended up using the following metric due to its low overhead and robustness to changes in the number of APs:

$$\frac{1}{|A|} \sum_{\forall a \in \mathcal{A}} \frac{\min(f_1(a), f_2(a))}{\max(f_1(a), f_2(a))} \quad (1)$$

Where A represents the union of the set of APs heard in the two samples; fi(a) represents the RSS heard from AP a in sample i (fi(a)=0, if a is not heard in sample i). The similarity value of this metric is between 0 and 1. The rationale for this equation is to add proportionally larger weights to the metric when an AP is heard at both locations with similar RSS. The normalization by the number of APs is used to make the metric more robust to changes in the number of APs between different locations.

Scalar-Valued Sensors: Each sample of these sensor streams can be represented by a single value, e.g. the gravity acceleration components. Note that even though some sensors are vector quantities, e.g. the gravity has three components along the x, y, and z directions; we treat each of them individually to detect a richer set of anchors. For a stream of particular sensor readings, we extract features from a sliding window of size w, where features include the mean, maximum, variance, skewness, etc of the readings within the sliding window. More formally, denote the readings inside the sliding window starting at time t as $$S = (s_t, s_{t+1}, \ldots, s_{t+w-1})$$

then each feature can be represented as v=g(S), where g is a function that maps the samples inside the window to a single feature value, e.g. the mean.

Anomaly Detection: An anchor is defined as a unique point in its surrounding. To enhance the efficiency of anchor detection 212, we employ an anomaly detection technique on each of the scalar-valued sensors readings. In particular, we estimated the distribution ($\hat{f}(v)$) of the obtained feature sequence (vi) as (Bernard W. Silverman 1986, and A. W. Bowman et al 1997):

$$\hat{f}(v) = \frac{1}{nh} \sum_{i=1}^{n} K\left(\frac{v - v_i}{h}\right) \quad (2)$$

where h is the bandwidth, n is the a sample size, and K is the kernel function. The choice of the kernel function is not significant for the results of the approximation (David W Scott 2009). Therefore, we choose the Epanechnikov kernel as it is bounded and efficient to integrate:

$$K(q) = \begin{cases} \frac{3}{4}(1 - q^2), & \text{if } |q| \leq 1 \\ 0, & \text{otherwise} \end{cases} \quad (3)$$

We also used Scott's rule to estimate the optimal bandwidth (David W Scott 2009):

$$h^* = 2.345 \hat{\sigma} n^{-0.2} \quad (4)$$

Where $\hat{\sigma}$ is the standard deviation of the feature stream.

After estimating the density function, we select critical bounds so that if the feature values observed exceeds those bounds, the observed values are considered anomalous. The critical bounds depend on the type of the feature selected; Given a significance parameter α and assuming $\hat{F}_j$ is the CDF of distribution shown in Equation 2, if the feature is a measure of central tendency (e.g. the mean), which can deviate to the left or the right, then lower and upper bounds will be calculated such that the lower bound is $\hat{F}_j^{-1}(\alpha/2)$ and the upper bound is $\hat{F}_j^{-1}(1-\alpha/2)$. However, if the feature is a measure of dispersion (e.g. the variance), which can only deviate in the positive (or right) direction, then an upper bound is only needed and is equal to $\hat{F}_j^{-1}(1-\alpha)$. We set α=0.4 in our experiment as it balances the number of detected anomalies.

Two Stage Clustering: We cluster the features using hierarchical clustering in the vector feature space. This clustering stage will group similar anomalies, e.g. all potholes, into one cluster. To identify the individual anchor instances within the same cluster, we apply a second stage of clustering; For a given cluster 212 generated from stage one, we apply spatial clustering 216 to the points inside it based on the points coordinates. To reduce outliers in both stages, a cluster is accepted only if the number of points inside it is above a threshold. In addition, a second stage spatial cluster is declared as an anchor if its points are confined to a small area and does not overlap with other clusters from the same anchor. The anchor location is taken as the weighted mean of the points inside the cluster.

Figure 8:
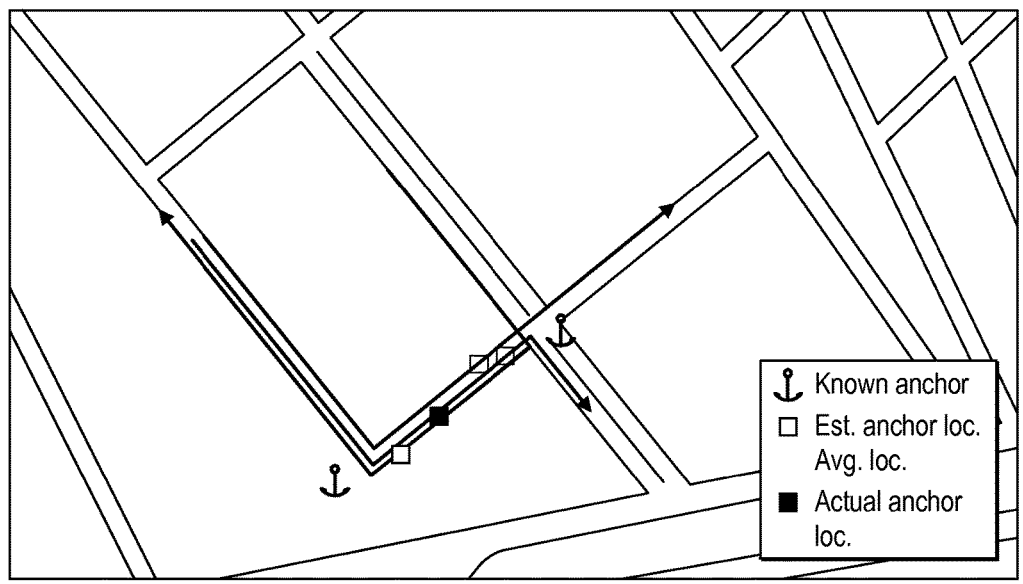
FIG. 8 shows different car traces passing by the same anchor and the corresponding estimated anchor location. The starting point of each trace is the point of the last error resetting event. Shorter traces have higher accuracy.

Computing the Anchor Location: Whenever an anchor is detected, whether physical or virtual, its location is estimated as the current estimated phone location. However, since the user location has inherent error in it, this error is propagated to the anchor location. To solve this issue and obtain an accurate anchor location, we leverage the central limit theorem. In particular, different cars will generally visit the same anchor through different independent paths. Therefore, averaging the reported locations for the same anchor from the different cars should converge to the actual anchor location. Moreover, we note that the longer the user trace before hitting an anchor from the last resetting point 206, the higher the error in the trace (FIG. 8). Therefore, we use weighted averaging to estimate the anchor position, given a higher weight to shorter traces.

Anchors Aliasing: Dejavu provides accurate and energy-efficient outdoor localization suitable for car navigation. Sometimes, different classes of anchors can be confused with other anchors at some samples. For example, a bump can be mistakenly detected as a railway crossing. To reduce this ambiguity, Dejavu leverages the map context information. In particular, using the current estimated user location, one can in the map within a certain area around the user location, reducing ambiguity. We also note that some physical anchors can be detected as virtual anchors using the anomaly detection and the unsupervised learning engine. Dejavu gives a higher priority to virtual anchors, which helps further reduce the ambiguity in the physical anchors detection, if any.

matching locally on the client. Both techniques have their pros and cons in terms of required resources, latency, and communication cost and the optimal choice depends on the system designer's goals.

Other Sensors: Other sensors on the phone, such as the mic and camera, can be leveraged to further increase the density of anchors and hence accuracy. However, careful planning should be employed to study the energy-accuracy tradeoff. Sampling these sensors at a low duty cycle can be leveraged to reduce the energy consumption.

Handling Heterogeneity: Different phones can have different sensor readings for the same anchor, especially in the range of readings. To address this, Dejavu implicitly applies a number of techniques including: anomaly detection based on the feature distribution, using scale-independent features (such as the variance), and combining a number of features for detecting the same anchor.

We implemented Dejavu on different android devices including HTC Nexus One, Samsung Galaxy Note, Samsung Galaxy Nexus, and Samsung Galaxy S Plus. We evaluated the system in the city of Alexandria, Egypt as well as a number of major highways, covering a combined road length of 89.5 km. Table 1 summarizes the test-bed parameters. Due to the low accuracy of the internal GPS for most of the used cell phones inside cities, we used an external bluetooth satellite navigation system that uses both the GPS and GLONASS systems as a ground truth.

| Testbed | Distance covered (km) | Speed (km/h) Avg. | Speed (km/h) Max | Phy Anch. | Virt. Vect. Sens. GSM | Virt. Vect. Sens. WiFi | Virt. Scalar sensors Acc. | Virt. Scalar sensors Magnet. | Virt. Scalar sensors Orient. |
|---|---|---|---|---|---|---|---|---|---|
| City | 39.5 | 12.6 | 55.8 | 3.3 | 50 | 112.2 | 10 | 7 | 9 |
| Highway | 50 | 51.1 | 100.1 | 1 | 33.3 | 7 | 2.9 | 1.7 | 1.4 |

Physical Anchor Detection Accuracy: Table 2 shows the confusion matrix for detecting different physical anchors. The table shows that different anchors have small false positive and negative rates due to their unique signatures; the overall detection accuracy is 94.3%.

|  | Cats Eye | Bumps | Curves | Rail Cross | Bridges | Tunnels | Turns | Un-class | FP | FN | Total traces |
|---|---|---|---|---|---|---|---|---|---|---|---|
| Cats Eye | 22 | 0 | 0 | 0 | 0 | 0 | 0 | 5 | 0 | 0.18 | 27 |
| Bumps | 0 | 30 | 0 | 3 | 0 | 0 | 0 | 0 | 0.03 | 0.09 | 33 |
| Curves | 0 | 0 | 20 | 0 | 0 | 0 | 0 | 0 | 0 | 0 | 20 |
| Rail cross. | 0 | 1 | 0 | 13 | 0 | 0 | 0 | 0 | 0.21 | 0.07 | 14 |
| Bridges | 0 | 0 | 0 | 0 | 9 | 0 | 0 | 1 | 0 | 0.1 | 10 |
| Tunnels | 0 | 0 | 0 | 0 | 0 | 10 | 0 | 0 | 0 | 0 | 10 |
| Turns | 0 | 0 | 0 | 0 | 0 | 0 | 0 | 0 | 0 | 0 | 40 |
| Overall |  |  |  |  |  |  |  |  | 0.03 | 0.06 | 154 |

Efficient Matching: Similarly, we can leverage the user location, though not completely accurate, for efficient anchor matching. Particularly, Dejavu limits its search space to a small area around the estimated user location. This significantly reduces the search space and increases the scalability of the system.

Figure 9:
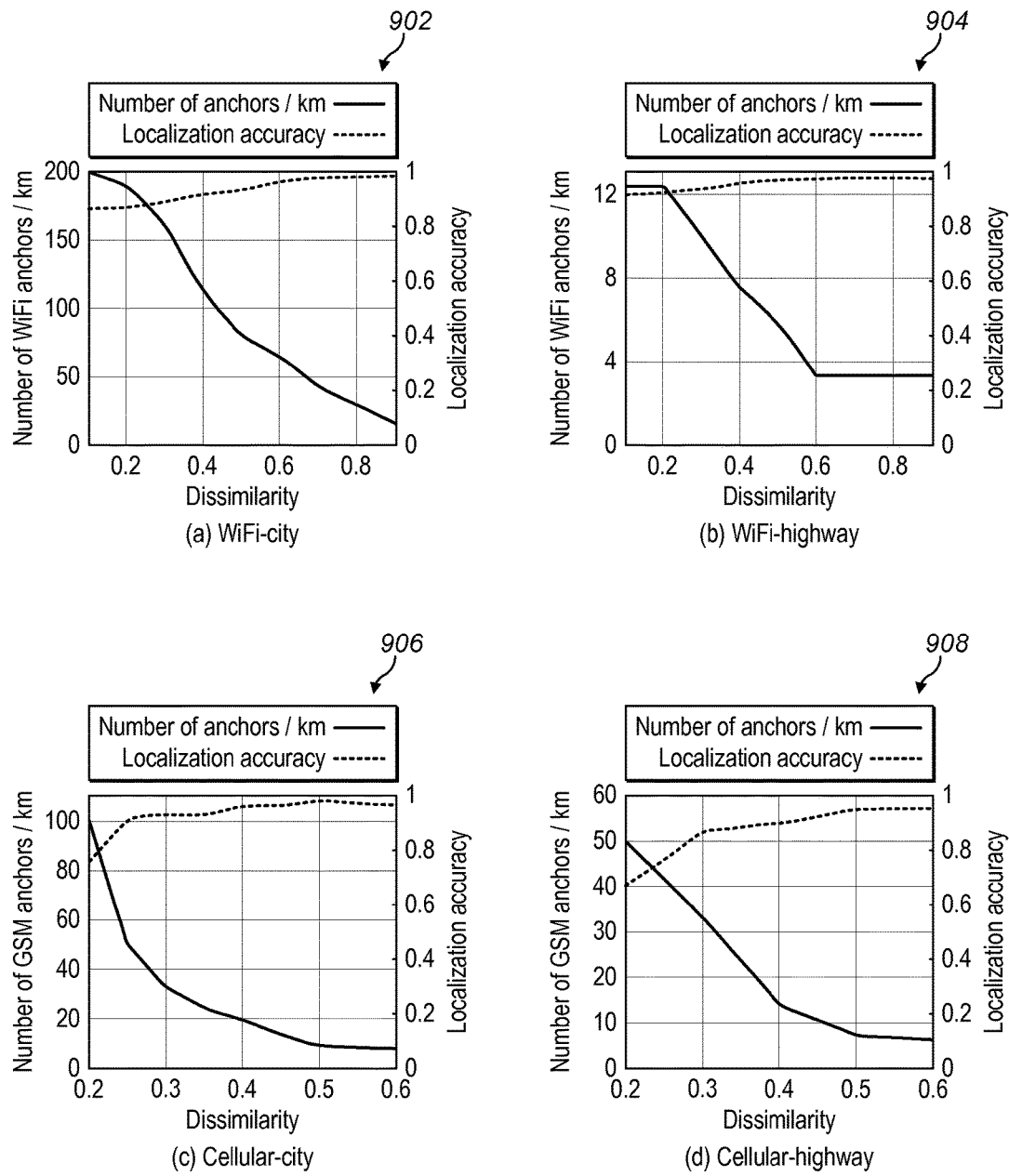
FIG. 9 shows the effect of changing similarity 902-908 threshold on anchor density and correctly identifying the anchor.

Processing Location: Dejavu can be split into a client-server architecture, where the sensors data is collected from the mobile and sent to the cloud for processing. Another model is to cache part of the anchors database on the client, based on the current estimated location, and perform the Virtual Anchor Detection Accuracy: FIG. 9 shows the effect of changing the similarity threshold on the vector-based anchor density as well as the ability to differentiate between adjacent anchors. This threshold is used in the first clustering stage to determine if two samples belong to the same cluster or not. Using a high value for the threshold leads to discovering more anchors. The figure also shows that, due to the better signal propagation in highways, more distance is required to separate the anchors at the same similarity threshold. Comparing WiFi anchors 902, 904 to cellular anchors 906, 908, WiFi anchors are denser in cities 902 due to their smaller coverage range and availability. However, since it is less probable to find WiFi APs on the highway, GSM anchors 908 are denser in this case. We set the similarity threshold to (0.4, 0.4) for WiFi and (0.25, 0.3) for GSM for the (in-city, highway) cases. These values provide a good number of vector-based anchors while maintaining good differentiation accuracy.

Figure 10:
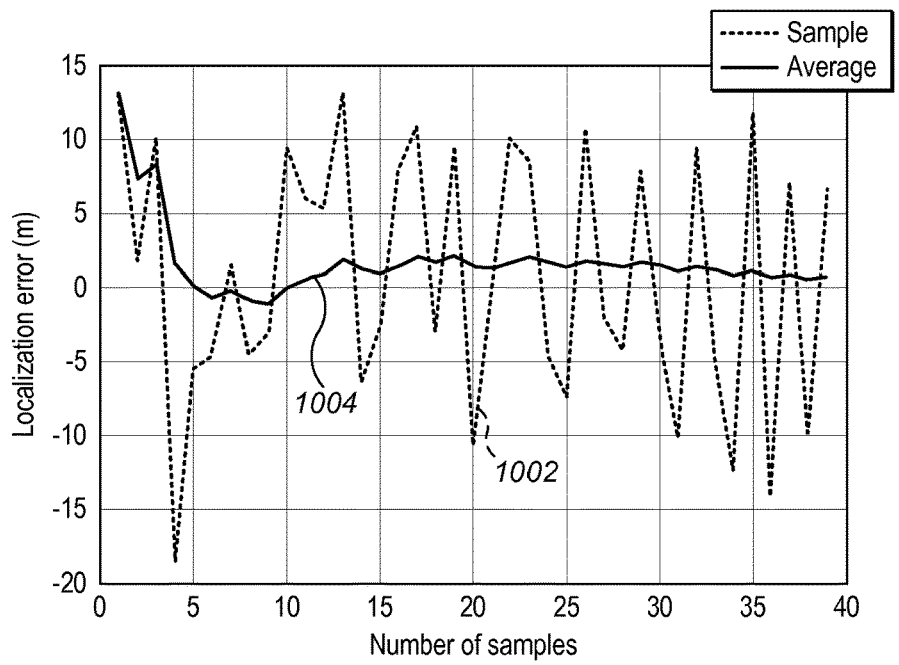
FIG. 10 shows the effect of the number of samples 1002 on the accuracy of estimating the anchor location.

Anchor Localization Accuracy: FIG. 10 shows that the error in the anchor location drops quickly 1004 as we increase the number of samples. We can consistently reach an accuracy of less than 5 m using as few as 20 samples 1002 for all discovered anchors.

Figure 11:
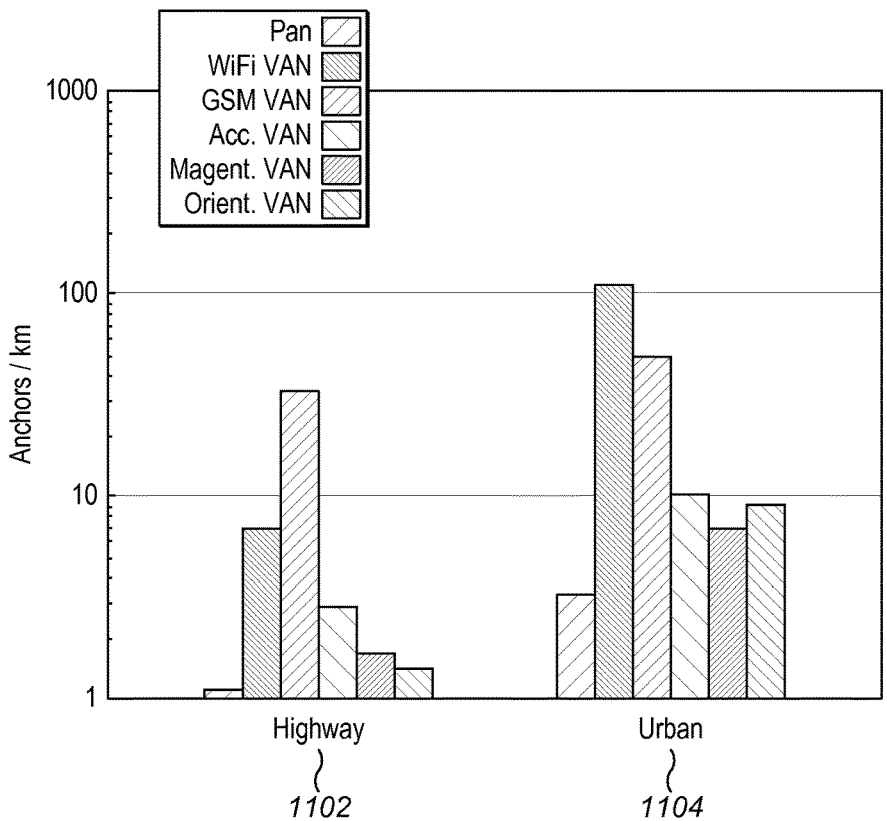
FIG. 11 shows the physical (PAN) and virtual (VAN) anchors density for the different classes in our test beds for Highway 1102 and Urban 1104 areas.

Effect of Anchor Density on Accuracy: FIG. 11 shows the density of anchors in our test beds. The figure highlights that there are indeed a large number of opportunities for error resetting, allowing Dejavu to obtain accurate and energy-efficient localization. In addition, virtual anchors are much denser than physical boot-strap anchors, highlighting their advantage. Since we use WiFi opportunistically and the number of anchors detected from the sensors varies from one road to another depending on its characteristics, we evaluate the effect of changing the anchor density on accuracy to generalize the obtained results to other areas. For this, we uniformly sample the detected anchors to obtain a specific density. The number of anchors is higher in general in urban areas 1104 compared to Highway 1102.

Figure 12:
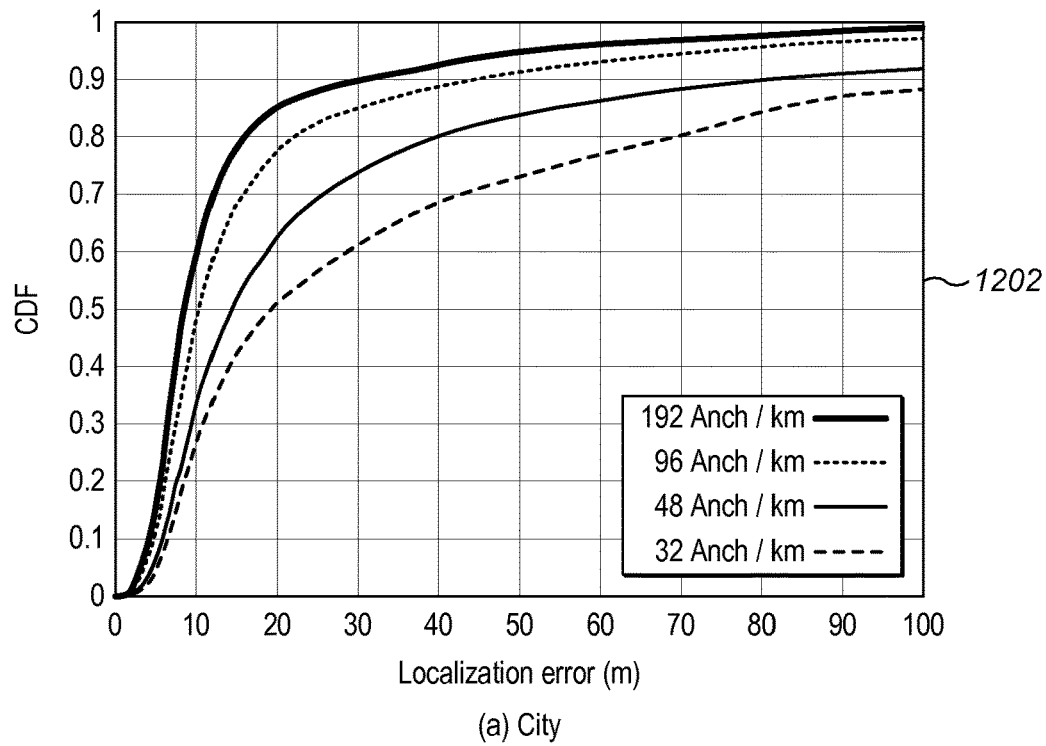
FIG. 12 shows the effect of density of anchors on the localization accuracy for City 1202 and Highway 1204.
Figure 12:
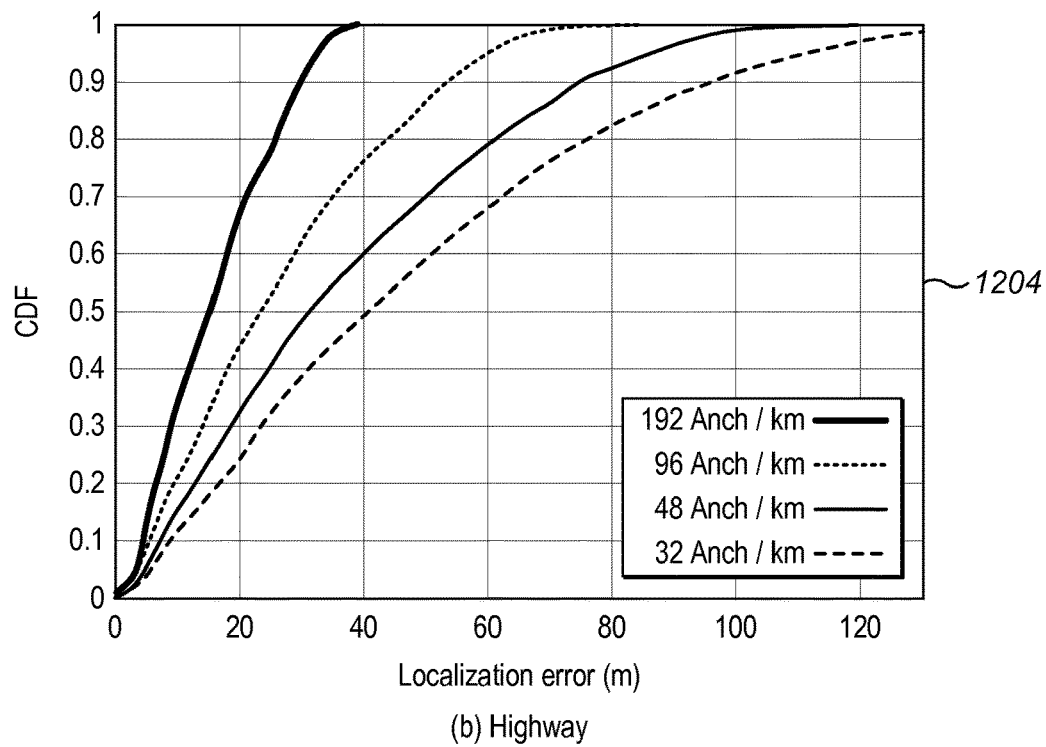

FIG. 12 shows the effect of anchor density on the system localization accuracy. We see that even with low density of anchors the accuracy is still high (23 m in City and 20 m in Highway)

Comparison with Other Systems: We compare the performance of Dejavu in terms of accuracy and energy consumption to GPS and GAC (Moustafa Youssef et. al. 2010). Similar to Dejavu, GAC uses dead-reckoning to estimate the phone location. However, to reset the accumulation of error, GAC synchronizes with the GPS with a low duty cycle. Table 3 summarizes the results.

Figure 13:
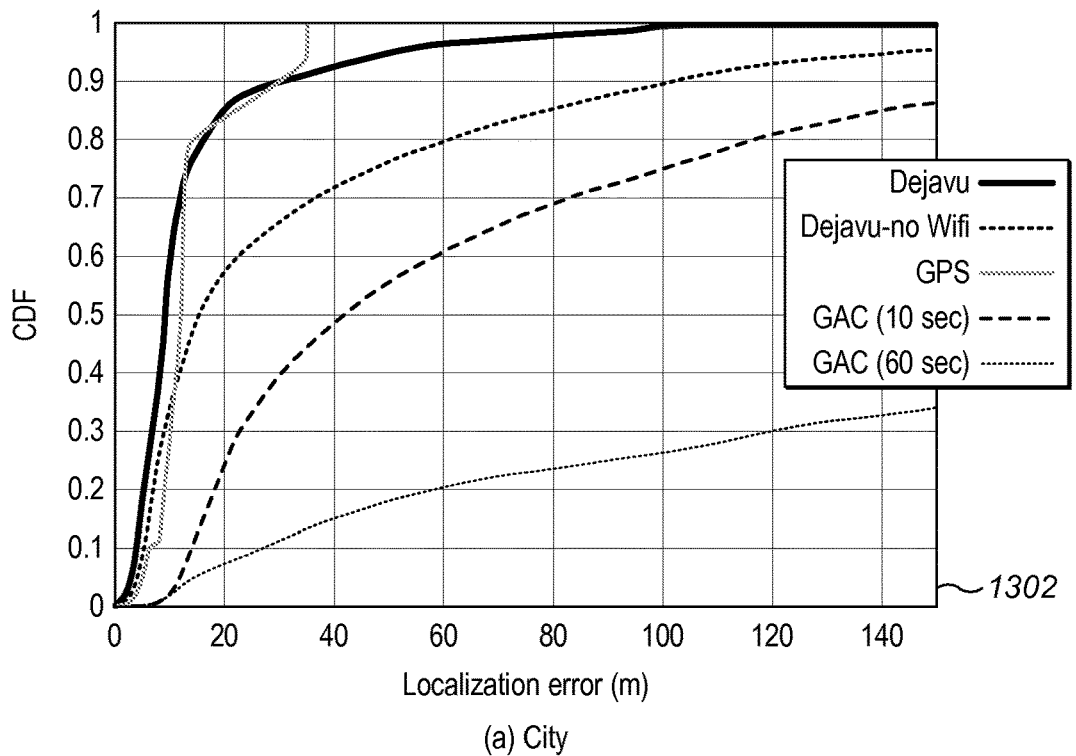
FIG. 13 shows the Cumulative Density Function (CDF) of localization error of System and method compared to GPS and GAC for City 1302 and Highway 1304.
Figure 13:
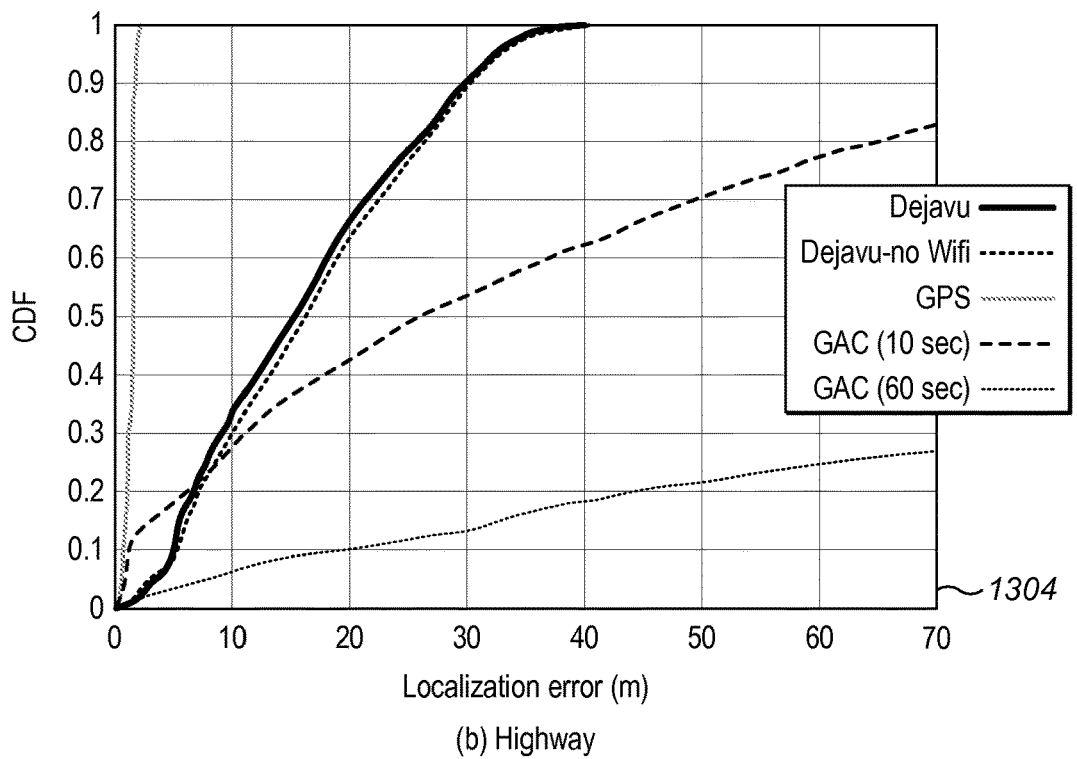

Localization Error: FIG. 13 shows the Cumulative Distribution Function (CDF) of localization error for the three systems. The GPS accuracies are reported by the android API. The figure shows that Dejavu gives better accuracy than GPS within cities 1302, even without the WiFi anchors, due to the urban canyon problem and going inside tunnels or under bridges that affect the GPS accuracy. Dejavu maintains its accuracy in highway driving 1304, though its accuracy is slightly less than GPS. GPS, however, has the best worst-case error, as in rare cases, i.e. at the tail of the distribution, discovering anchors may be delayed, leading to accumulation of the error from dead-reckoning. GAC (Moustafa Youssef et. al. 2010) accuracy, on the other hand, depends on the duty cycle; ranging from good accuracy (synchronization rate of once per 10 seconds) to hundreds of meters (synchronization rate of once every 60 seconds). This has a huge impact on the energy consumption though, as quantified in the next section. Note also that when GPS performs poorly, e.g. inside cities, GAC accuracy are also affected.

Figure 14:
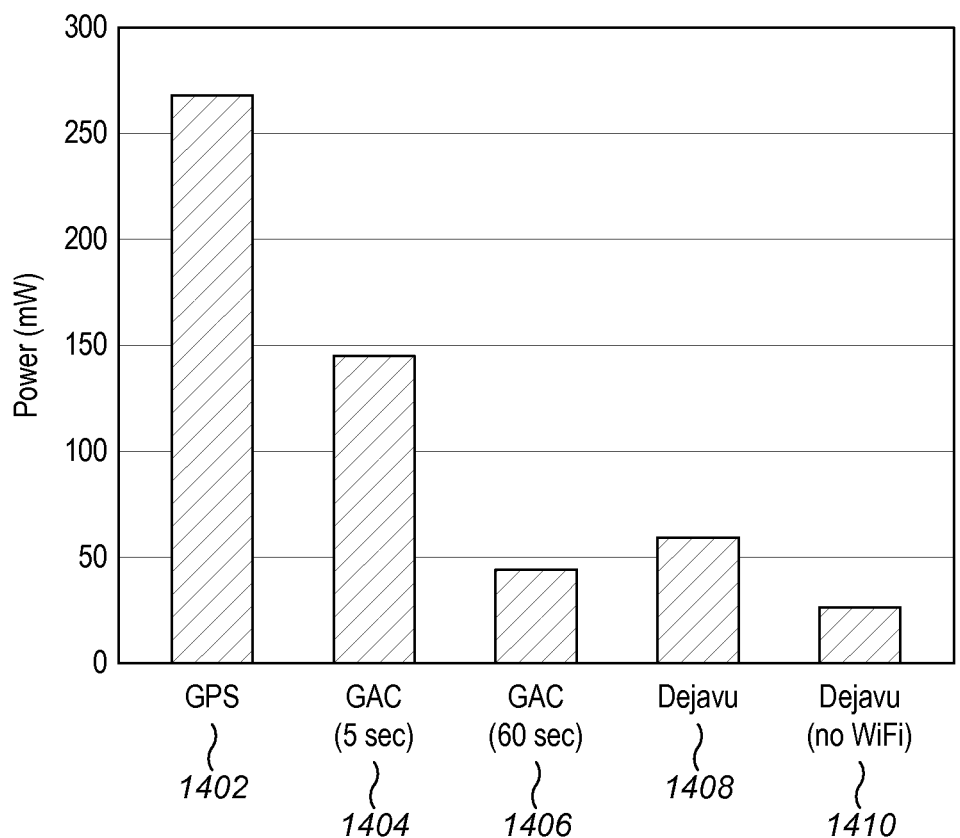
FIG. 14 shows the power consumption for different systems, namely GPS 1402, GAC 1404-1406, System and method without WiFi 1408 and System and method with WiFi 1410.

Power Consumption: FIG. 14 shows the power consumption for the different systems calculated using the PowerTutor profiler (Lide Zhang et. al. 2010) and the android APIs using the HTC Nexus One cell phone. The figure shows that Dejavu has a significant advantage in power consumption 1408, with 347% saving in power compared to the GPS 1402. The no-WiFi mode 1410 can further double this advantage.

Figure 15:
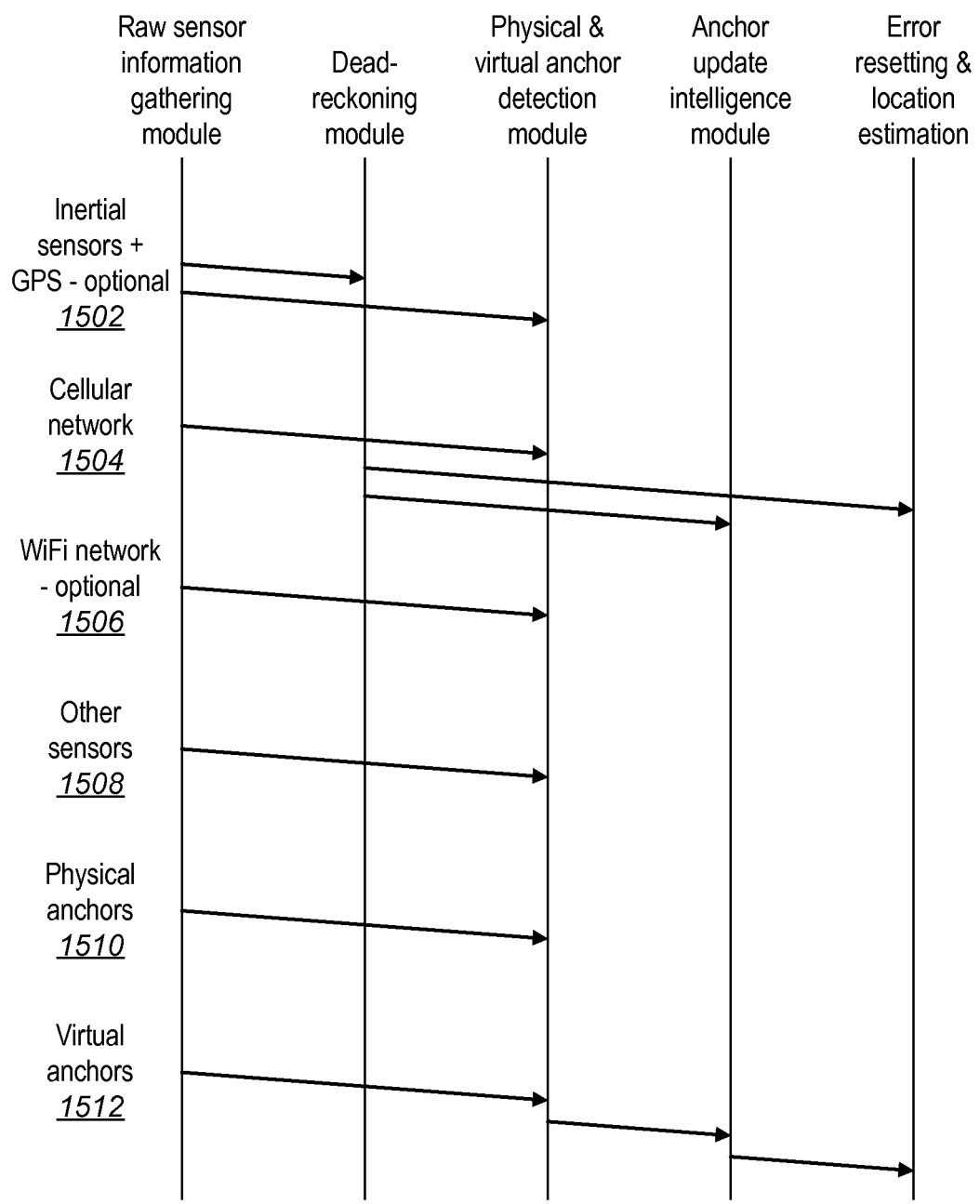
FIG. 15 provides the message sequence diagram for error optimization and location estimation. Inertial sensors and GPS 1502 contribute towards Dead-reckoning module, while others such as Cell network 1504, WiFi network 1506, other sensors 1508, physical anchors 1510 and virtual anchors 1512 contribute towards physical and virtual anchor detection. Both taken together optimize error and increases location estimation.

FIG. 15 provides the message sequence diagram for error optimization and location estimation. Inertial sensors and GPS (optional) 1502 contribute towards physical and virtual anchor detection module. Cell network 1504 goes to Physical and virtual anchor module, and the new location goes to anchor update module to update their location. WiFi network 1506, other sensors 1508, physical anchors 1510 and virtual anchors 1512 contribute towards physical and virtual anchor detection. Both taken together optimize error and increases location estimation.

Figure 16:
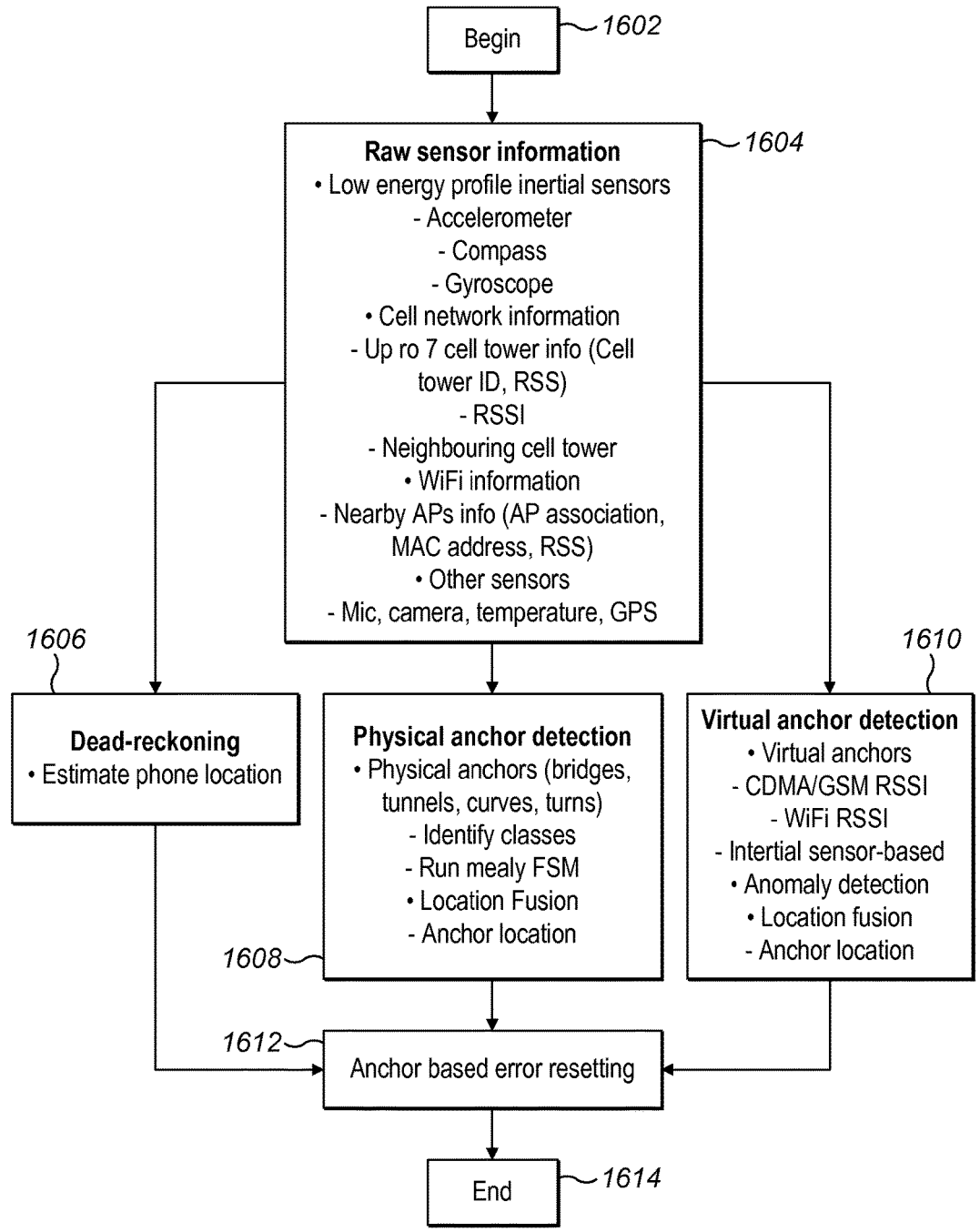
FIG. 16 shows the flow chart for calculating location optimally. Initially raw sensor information is collected 1604 and passed to dead reckoning 1606, physical anchor detection 1608 and virtual anchor detection 1610. The proposed method calculates the anchor based error resetting 1612 based on all the information.

FIG. 16 shows the flow chart for calculating location optimally. Initially raw sensor information is collected 1604 and passed to dead reckoning 1606, physical anchor detection 1608 and virtual anchor detection 1610. Raw sensor information collected includes low energy profile inertial sensors such as accelerometer, compass and gyroscope. In the cell network information, up to seven cell tower information including ID and RSS is collected. In WiFi, nearby access point information, MAC address and RSS is collected. Other sensors such as Microphone, Camera, Temperature and GPS are used when available. The proposed method calculates the anchor based error resetting 1612 based on all the information collected from Dead-reckoning 1606, Physical anchor detection 1608 and virtual anchor detection 1610. In physical anchor detection, anchors such as bridges, tunnels, curves, turns and other road anomalies such as bumps are considered. In virtual anchor detection, anomaly detection is done in addition to virtual anchors—such as CDMA/GSM RSSI, WiFi RSSI and Inertial sensor based measurements. Location fusion based on anchor location is also done.

INDUSTRIAL APPLICABILITY

Accordingly, the specification and drawings are to be regarded in an illustrative rather than a restrictive sense. The invention is valid for cell phone networks and smart phones that work in WiFi networks. The invention works with all smart phones that are equipped with standard sensors. The invention does not expect GPS to be available in the smart phone to estimate the location. The methodology is general enough to work without GPS. The invention does not require any special permission to be deployed on the smart devices. The hallmark of the invention is that the innovation works without GPS, using low energy profile sensors to estimate location and detect landmarks in the environment based on sensor profiles without using extra energy. The invention is directly applicable to industry as existing location-based services such as car navigation can directly benefit from its accuracy and low energy requirement. The discovered landmark repository in invention can provide more semantic information to existing maps. The invention is also directly applicable to the map industry where accurate maps are needed at ground level for people to move about and those with disability.

What is claimed is:

1. A method, comprising:
   using a dead reckoning approach for calculating an initial location data using sensor data residing on a mobile device sensor;
   identify a virtual anchor data and a physical anchor data using the sensor data;
   updating the virtual anchor data and physical anchor data using the dead-reckoning data and sensor data;
   fixing the error in the dead reckoning data by incorporating the virtual anchor data and the physical anchor data to create a new location data wherein the virtual anchor and physical anchor data are used for correcting the dead reckoning data to estimate a location of the mobile device, wherein the method extends the smart phone battery lifetime by 347% due to usage of existing sensors within smart phones and not draining on constant usage by localization agents such as a GPS; and displaying a location information on a mobile device for a user using the new location data.

2. The method of claim 1, further comprising:
creating the virtual anchor data using a virtual anchor comprising of a CDMA/GSM and WiFi received signal strength indication data, an inertial sensor-based data, an anomaly detection calculation, a location fusion and an anchor fusion.

3. The method of claim 1, wherein the gathered physical anchor includes at least one of a bridge, tunnel, curves, turns in the road way and road anomalies and combination thereof.

4. The method of claim 1, wherein the sensor data is at least one of an accelerometer data, compass data, gyroscope data, cell network information, cell tower ID, Microphone, camera, temperature and combination thereof.

5. The method of claim 1, further comprising:
crowd-sourcing to automatically learn a virtual landmark and a location for the virtual landmark for calculating the direction data.

6. The method of claim 1, wherein the sensor is at least one of a standard cell-phone and smart phone inertial sensors.

7. The method of claim 1, wherein an estimation of the location of the mobile device location using the smart phone is within 8.4 m median error in city roads and 16.6 m on highways.

8. A method, comprising:
calculating a virtual anchor data and physical anchor data comprising of a CDMA/GSM and WiFi information data, an inertial sensor-based data residing on a mobile device, an anomaly detection calculation, feature-space clustering and a spatial clustering to identify a virtual anchors and physical anchor; and
resetting the dead-reckoning data the error in the dead-reckoning data and calculate an accurate estimate of a mobile device user wherein fixing the error in the dead reckoning data is performed by incorporating the virtual anchor data and physical anchor data to create a new location data, wherein the method extends the smart phone battery lifetime by 347% due to usage of existing sensors within smart phones and not draining on constant usage by localization agents such as a GPS.

9. The method of claim 8, further comprising:
crowd-sourcing to automatically learn a virtual landmark and a location for the virtual landmark for calculating the direction data.

10. The method of claim 8, wherein a vincenty formula is used for estimating the location of the mobile device using the inertial sensor data via the dead-reckoning approach.

\* \* \* \* \*